United States Patent
Odenwald et al.

(10) Patent No.: US 7,730,252 B2
(45) Date of Patent: Jun. 1, 2010

(54) METHOD, APPARATUS AND SYSTEM FOR SERIAL ATTACHED SCSI (SAS) ZONING MANAGEMENT OF A DOMAIN USING CONNECTOR GROUPING

(75) Inventors: Louis Henry Odenwald, Wichita, KS (US); Roger Hickerson, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 68 days.

(21) Appl. No.: 12/261,163

(22) Filed: Oct. 30, 2008

(65) Prior Publication Data

US 2010/0115163 A1    May 6, 2010

(51) Int. Cl.
*G06F 13/00* (2006.01)

(52) U.S. Cl. .............. 710/300; 710/2; 710/36; 711/114

(58) Field of Classification Search ......... 710/300–317, 710/2, 8–10, 15–17, 36–38; 711/111–115
See application file for complete search history.

(56) References Cited

U.S. PATENT DOCUMENTS

| 7,644,304 | B2* | 1/2010 | Kotzur et al. ................. 714/7 |
| 2005/0143079 | A1* | 6/2005 | Seto ......................... 455/450 |
| 2008/0120687 | A1* | 5/2008 | Johnson ....................... 726/1 |
| 2009/0222733 | A1* | 9/2009 | Basham et al. ............. 715/736 |
| 2009/0319652 | A1* | 12/2009 | Odenwald et al. ........... 709/223 |
| 2010/0036948 | A1* | 2/2010 | Cassiday et al. ............ 709/225 |

* cited by examiner

*Primary Examiner*—Raymond N Phan

(57) ABSTRACT

Embodiments of the invention include a method, apparatus and system for managing SAS zoning, using connector grouping. A connector grouping management application is configured to allow connectors on the edge of the ZPSDS to be grouped into defined zones. The defined zones are used to create a minimal number of zone groups and to configure the respective permissions of the zone groups. The connector grouping application then compares all existing zone groups for phys common to more than one zone group. The connector grouping application removes all phys common to more than one zone group from the respective zone groups and moves the common phys to a new zone group. The zone groups are processed in this manner until no zone groups have common phys. Once all zone groups have been processed accordingly, information associated with the resulting zone groups and their respective permissions are transferred to the zone manager.

19 Claims, 6 Drawing Sheets

METHOD, APPARATUS AND SYSTEM FOR SERIAL ATTACHED SCSI (SAS) ZONING MANAGEMENT OF A DOMAIN USING CONNECTOR GROUPING

BACKGROUND OF THE INVENTION

1. Field of the Invention

The invention relates to the Serial Attached SCSI (SAS) data transfer technology protocol. More particularly, the invention relates to methods, devices and system architectures for SAS Zoning management.

2. Description of the Related Art

SCSI refers to the Small Computer Systems Interface set of electronic interface standards that allow various devices to communicate with one another, e.g., computers to communicate with peripheral devices. Serial Attached SCSI (SAS) refers to a point-to-point serial protocol for data transfer technology between computer network storage devices, such as hard drives and tape drives. An SAS domain is an input/output (I/O) system that includes a set or network of SAS devices that communicate with one another.

SAS provides switching capability using (SAS) expanders, which act as switches between SAS initiators (e.g., hosts) and SAS targets (e.g., end devices, such as disk drives), and are fully capable of connecting multiple SAS hosts to multiple SAS end devices. Accordingly, SAS is being explored as a possible mechanism for connecting large groups of targets in various storage area network (SAN) applications, and other applications. Within such SAN applications, the management of SAS domains is a key element to the success of SAS implementation within the network systems that make up the SAS domains.

In general, an SAS initiator device directs information to an SAS target device through ports of one or more SAS expanders in the SAS domain. A port can include one or more physical links, or phys, to connect devices in an SAS domain. A port can use a single phy or, if the port is configured as a wide port, can use multiple phys logically grouped to provide higher bandwidth. Ports are formed dynamically, although multiple phys also can be physically grouped in a static manner, i.e., a connector. Often, ports and connectors end up grouping the same phys.

The SAS specifications presently support zoning capabilities within an SAS domain. SAS zoning is implemented by one or more (typically a set of) zoning expanders that cooperate to define the zoned service delivery subsystem (ZSDS). The zoning expanders, i.e., SAS expanders with zoning capabilities, control whether a phy is permitted to open a connection to or participate in a connection with another phy. Such control determines whether two SAS devices attached to the SAS zoning expander through the phys are able to communicate. Such communication is important for sharing storage resources among multiple servers, including the ability to prevent servers from connecting to other servers and associated storage devices of the other servers.

The phys of the SAS zoning expanders are assigned zone groups. A zone group is a set of phys in a zoned portion of a service delivery subsystem (ZPSDS) that can have the same access permissions. A zoned portion of a service delivery subsystem (ZPSDS) is a group of zoning expander devices that cooperate to control access between phys. When SAS exchanges are routed through SAS zoning expanders, the SAS zoning expanders may verify that the phys (e.g., the SAS devices coupled to the phys) are permitted to participate in the connection. Also, the SAS zoning expanders may deny the connection if the phys are not permitted to participate in the connection.

Conventionally, applications designed to manage SAS zoning allow each phy on the edge of the ZPSDS to be assigned into a zone group, then allow permissions to be established and assigned for the zone groups to communicate with one another. Such a relatively direct SAS zoning approach often poses several problems for the management application.

For example, application administrators typically think about visibility among devices, such as to which target devices a particular initiator device should have access. Such approach is analogous to Fibre Channel (FC) World Wide Name (WWN) based zoning, and most often is used in dynamic topologies where changes sometimes may occur. Also, application administrators sometimes think in terms of connectors or ports, such as to what other connectors should devices attached to a particular connector have access. Such approach is analogous to Fibre Channel (FC) Port based zoning, and most often is used in static topologies. Sometimes application administrators want to implement a specific strategy, such as preventing access by a first SAS device to another SAS device. In all of these cases, conventionally, the SAS zoning application has to deconstruct the zoning requirements, i.e., break down the device or connector model to the phy level, to be able to map phys into zone groups and then to assign zone group permissions.

Moreover, all of the target devices in the SAS domain are not always attached directly to the ZPSDS. Therefore, target devices sometimes are forced to share a common ZPSDS entry point associated with the same zone group. When this occurs, the SAS zoning application must bundle target devices together based on their ZPSDS attachment points to see if zoning requirements can be realized on a particular topology before breaking down the device or connector model to the phy level to map phys into zone groups and assign zone group permissions.

SUMMARY OF THE INVENTION

The invention is embodied in a method, apparatus and system for managing SAS zoning, using connector grouping, without requiring the SAS zoning management requirements to be deconstructed down to the phy level. A connector grouping management application is configured to allow connectors on the edge of the ZPSDS to be grouped into any number of zones or zone configurations. These defined zones are used to create a minimal number of zone groups, e.g., by creating one zone group per defined zone and populating the zone group with the phys associated with the connectors in the zone from which the zone group is based, and to configure the respective permissions of the created zone groups. The connector grouping application then compares all existing zone groups for phys common to more than one zone group. The connector grouping application removes all phys common to more than one zone group from their respective zone groups and moves the common phys to a new zone group. The zone groups are compared and processed in this manner until no zone groups have common phys. Once all zone groups have been processed accordingly, information associated with the resulting zone groups and their respective permissions are transferred to the zone manager.

DETAILED DESCRIPTION OF EXEMPLARY EMBODIMENTS

Figure 1:
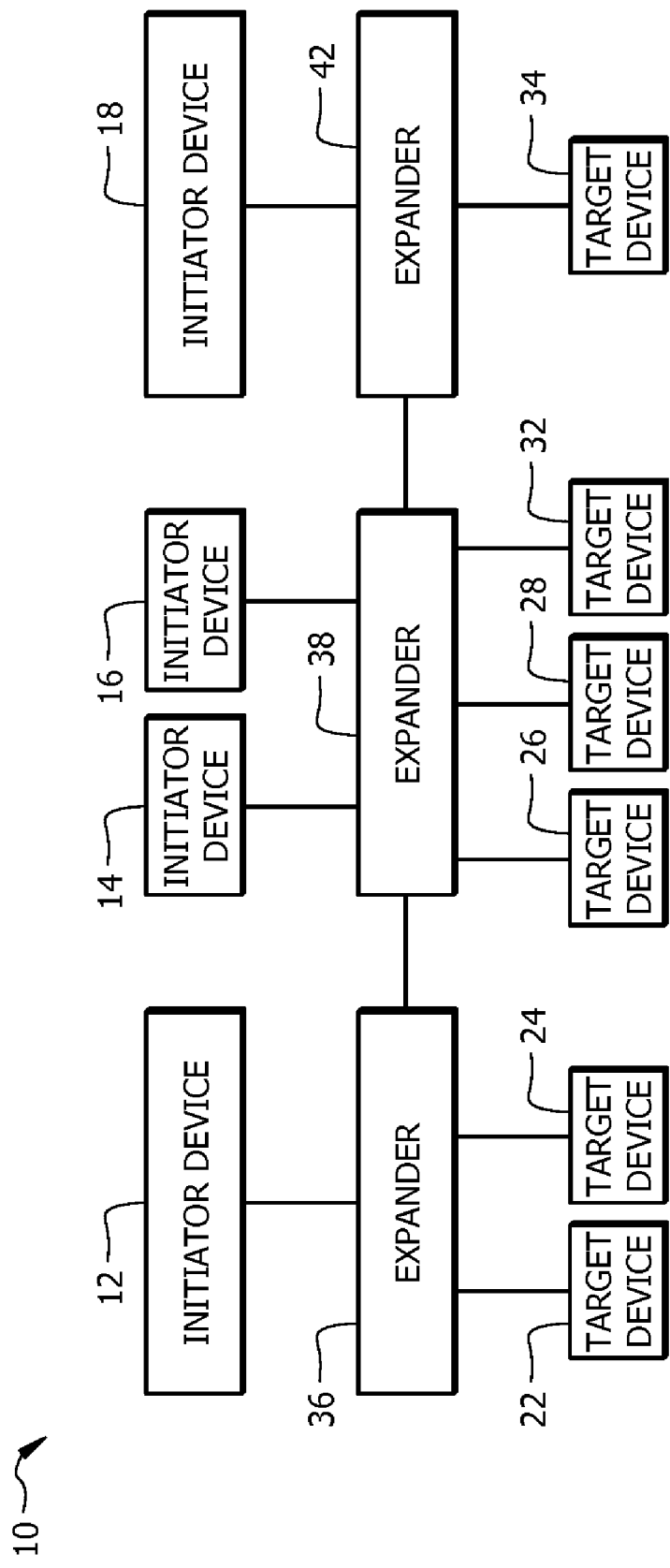
FIG. 1 is a schematic view of a conventional SAS domain that supports conventional SAS zoning capabilities.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

A SAS connector grouping management application is described herein that simplifies the work of an SAS domain administrator. The connector grouping methods, devices and systems described herein allow an SAS domain administrator to interface with the particular SAS zoning application without requiring the administrator to deconstruct the zoning requirements down to the phy level. The connector grouping methods, devices and systems described herein allow connectors on the edge of the ZPSDS to be grouped into any number of zones or zone configurations. These defined zone configurations then are used to create the minimal number of zone groups, and to configure the respective permissions of those zone groups.

Referring now to FIG. 1, shown is a schematic view of a conventional SAS domain 10 that supports conventional SAS zoning capabilities. The SAS domain 10 includes one or more SAS initiators or initiator devices 12, 14, 16, 18, which can be SAS hosts or other suitable SAS initiator devices. The SAS domain 10 also includes one or more SAS targets or target devices 22, 24, 26, 28, 32, 34, which can be SAS end devices, such as disk drives, or other suitable SAS target devices. The SAS domain 10 also includes one or more SAS zoning expanders or expander devices 36, 38, 42, which are SAS expander devices with SAS zoning capabilities.

Each of the SAS zoning expanders 36, 38, 42 typically is coupled to one or more initiator devices 12, 14, 16, 18, and coupled to one or more target devices 22, 24, 26, 28, 32, 34. The SAS zoning expanders 36, 38, 42 also can be coupled to each other, e.g., as shown. As discussed hereinabove, an SAS expander acts as a switch between SAS initiators and SAS targets, e.g., in a manner that allows multiple SAS initiators to connect to and communicate with multiple SAS targets. Thus, SAS expanders can allow SAS exchanges to be routed between any of the SAS initiator devices and any of the SAS target devices within the SAS domain 10.

Each SAS initiator device, SAS target device, and SAS zoning expander within the SAS domain 10 has one or more physical links or physical link layers, known as phys. Connections between two or more SAS devices are made through the phys of the SAS devices. Connections may be routed between SAS devices through one or more of the SAS zoning expanders 36, 38, 42. That is, each of the SAS zoning expanders 36, 38, 42 typically are configured to control whether a device phy is permitted to open a connection to or participate in a connection with another device phy. Also, the SAS zoning expanders 36, 38, 42 define or cooperate to define a zoned service delivery subsystem (ZSDS) within the SAS domain 10. Phys of a particular SAS zoning expander can be assigned a particular zone group. The SAS zoning expanders 36, 38, 42 can include zoning capabilities enabled according to the SAS specifications and enhanced by the features and aspects of applications according to embodiments of the invention, as will be described in greater detail hereinbelow.

For appropriate SAS domain management, devices associated with the SAS domain management architecture should be able to execute various management applications that uniquely identify various domains within the network arrangement and perform various domain management functions within those domains. For example, an application or service that manages SAS domains can be running on a zone manager or work station within the network. The SAS domain management application or service can be connected to a single domain via an in-band connection, e.g., through an SAS host bus adapter (HBA) resident on the zone manager and/or the workstation. Alternatively, the SAS domain management application or service can be connected via an out-of-band connection, e.g., over an Ethernet connection to an expander or switch. According to embodiments of the invention, an SAS domain management application or service can include an SAS zoning management application with connector grouping, e.g., a connector grouping application that includes one or more specialized algorithms (or wizards), residing at least partially within the zone manager and/or the work station.

Figure 2:
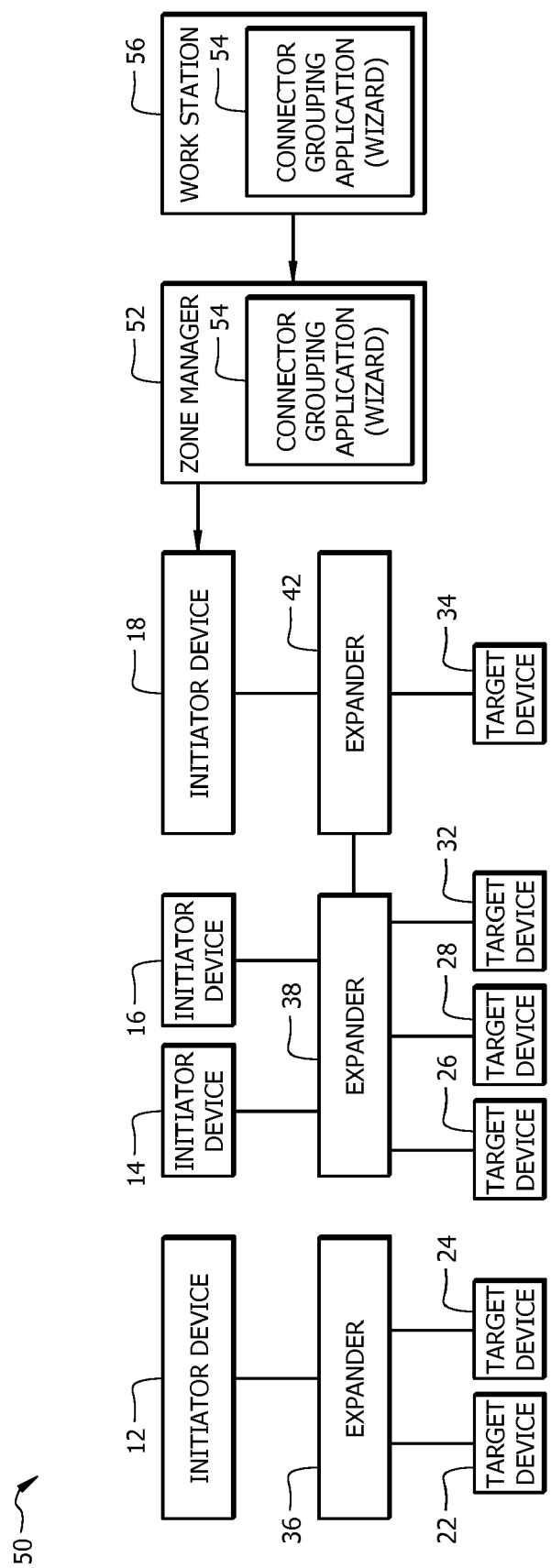
FIG. 2 is a schematic view of an SAS domain including or having coupled thereto an SAS zoning management application according to embodiments of the invention.

For example, referring now to FIG. 2, shown is a schematic view of an SAS domain 50 including or having operably coupled thereto an in-band SAS zoning management application with connector grouping according to embodiments of the invention. The SAS domain 50 can include a zone manager 52 operably coupled to one or more of the initiator devices 12, 14, 16, 18 and/or one or more of the SAS zoning expanders 36, 38, 42, e.g., via one or more suitable in-band connections, such as through an HBA bus adaptor (not shown) residing on the zone manager 52. The zone manager 52 includes the appropriate interface or interfaces for operably coupling to one or more of the initiator devices 12, 14, 16, 18 and/or one or more of the SAS zoning expanders 36, 38, 42. The zone manager 52 also can include appropriate memory, controllers and/or other components that can include at least a portion of the connector grouping applications 54 and methods according to embodiments of the invention. Alternatively, at least a portion of the connector grouping applications 54 and methods according to embodiments of the invention can be provided by a work station operably coupled to the zone manager.

Figure 3:
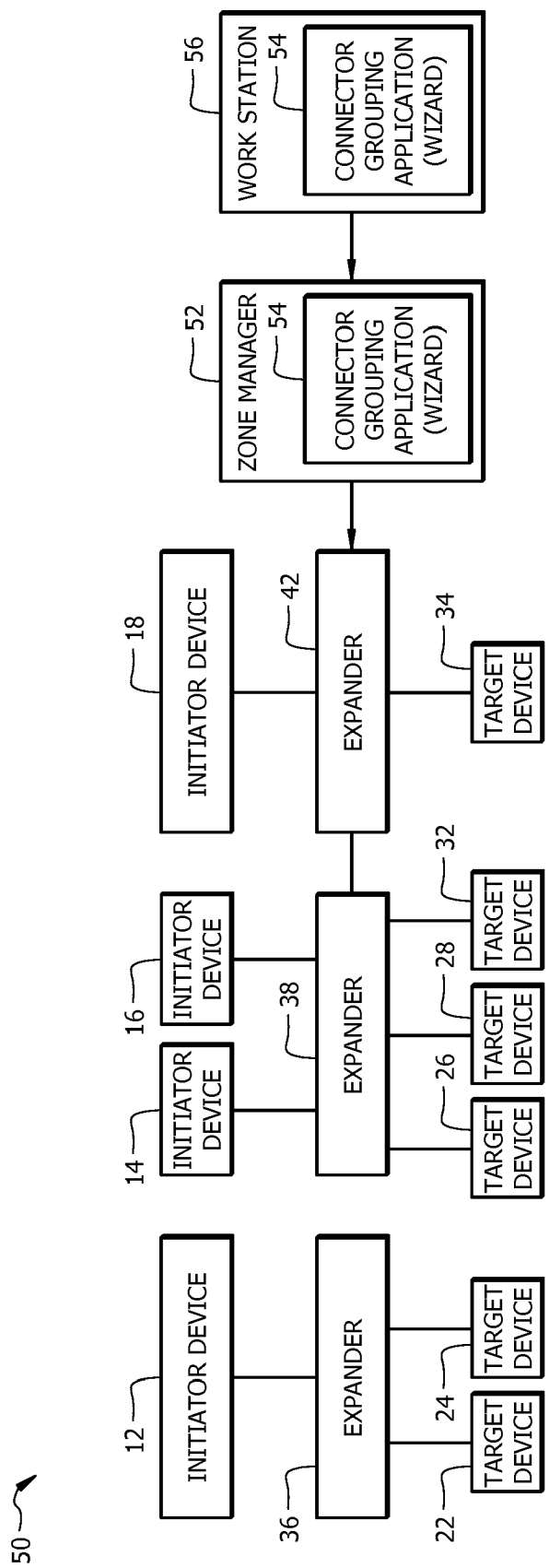
FIG. 3 is a schematic view of an SAS domain including or having coupled thereto an SAS zoning management application according to alternative embodiments of the invention.

Alternatively, referring now to FIG. 3, shown is a schematic view of the SAS domain 50 including or having operably coupled thereto an out-of-band SAS zoning management application with connector grouping according to embodiments of the invention. The SAS domain 50 can include a zone manager 52 coupled to one or more of the SAS zoning expanders 36, 38, 42, e.g., via one or more suitable out-of-band connections, such as via an Ethernet connection. The zone manager 52 includes the appropriate interface or interfaces for operably coupling to one or more of the SAS zoning expanders 36, 38, 42. Also, as discussed hereinabove, the zone manager 52 can include appropriate memory, controllers and/or other components with at least a portion of the connector grouping applications 54 and methods or, alternatively, at least a portion of the connector grouping applications 54 and methods can be provided by a work station 56 operably coupled to the zone manager 52.

One or more of the zone manager 52 and the work station 56 can be comprised partially or completely of any suitable structure or arrangement, e.g., one or more integrated circuits. Also, it should be understood that the zone manager 52 and the work station 56 each include other components, hardware and software (not shown) that are used for the operation of other features and functions of the respective devices not specifically described herein. All relevant portions of one or both of the zone manager 52 and the work station 56 can be partially or completely configured in the form of hardware circuitry and/or other hardware components within a larger device or group of components. Alternatively, all relevant portions of one or both of the zone manager 52 and the work station 56 can be partially or completely configured in the form of software, e.g., as processing instructions and/or one or more sets of logic or computer code. In such configuration, the logic or processing instructions typically are stored in a memory element or a data storage device. The data storage device typically is coupled to a processor or controller, and the controller accesses the necessary instructions from the data storage element and executes the instructions or transfers the instructions to the appropriate location within the respective device.

According to embodiments of the invention, SAS zoning management including connector grouping applications 54 involves allowing connectors on the edge of the ZPSDS to be grouped into any number of zones or zone configurations. These defined zone configurations then are used to create the minimal number of zone groups, and to configure the respective permissions of those zone groups.

Figure 4:
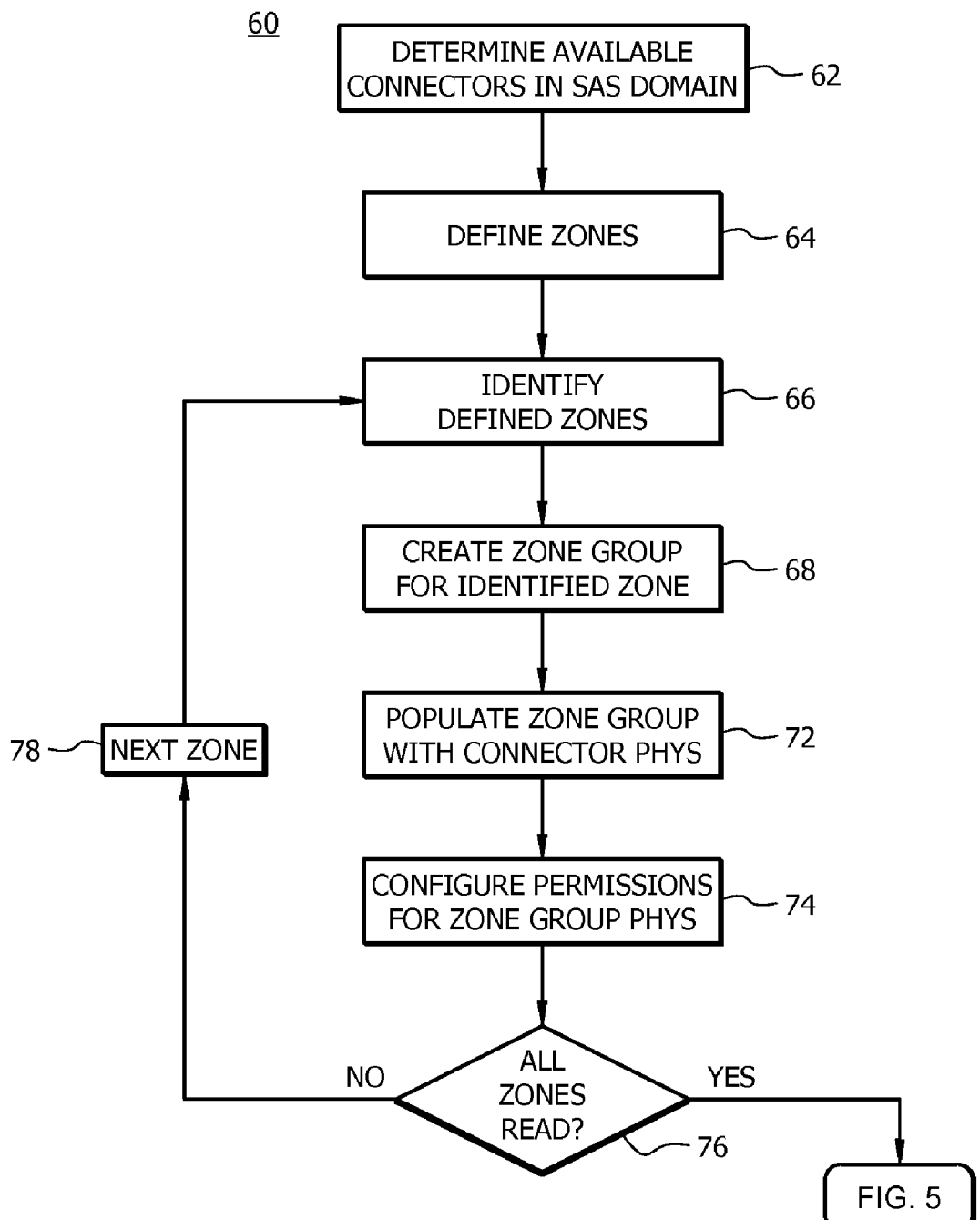
FIG. 4 is a block diagram of an initial portion of a method for SAS domain zoning using connector grouping according to embodiments of the invention.
Figure 5:
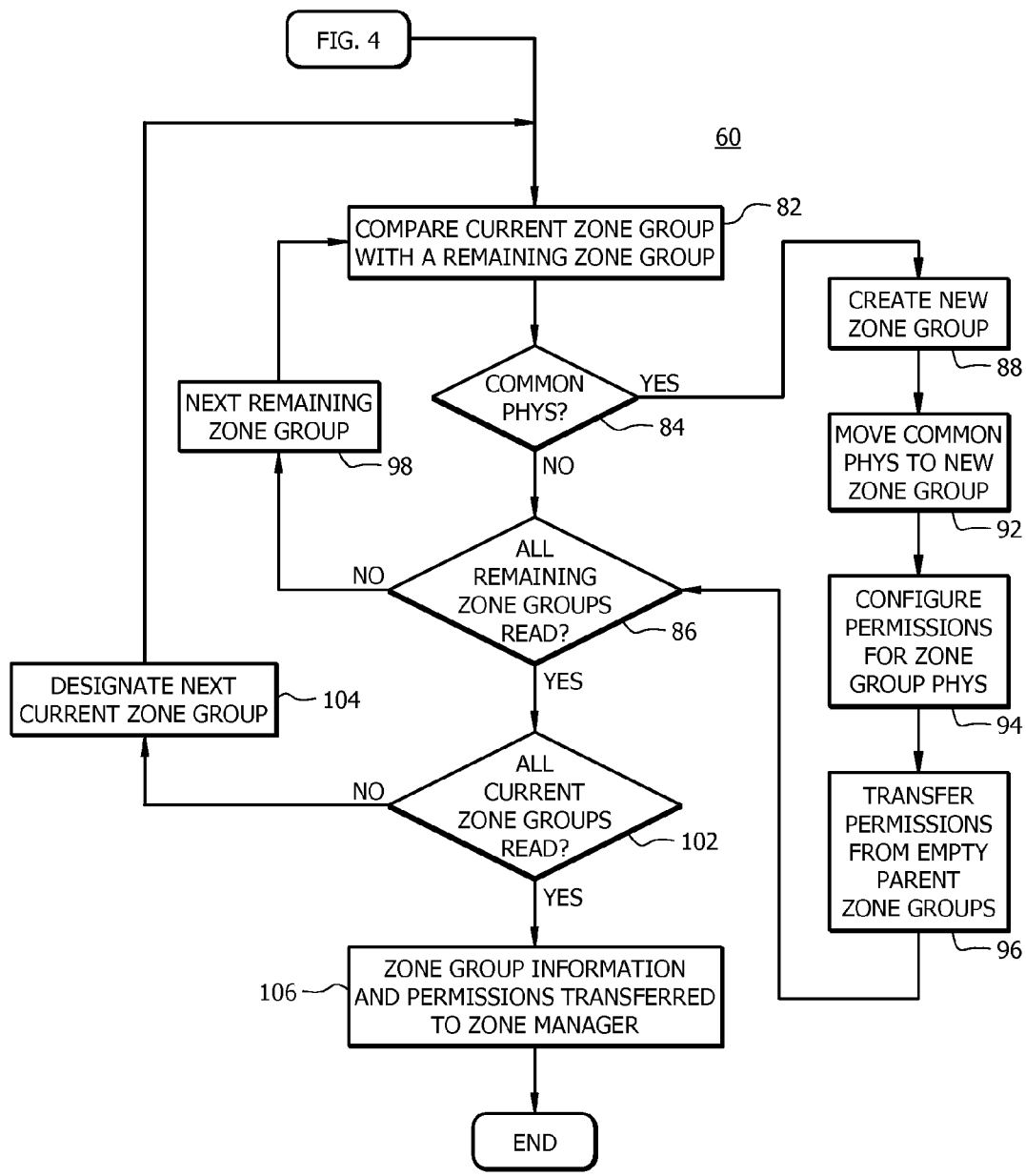
FIG. 5 is a block diagram of a remaining portion of a method for SAS domain zoning using connector grouping according to embodiments of the invention.

As an example, referring now to FIG. 4, shown is a block diagram of an initial portion of a method 60 for SAS domain zoning using a connector grouping application 54 according to embodiments of the invention. A remaining portion of the method 60 is shown in FIG. 5 and described hereinbelow. As discussed hereinabove, all or a portion of the connector grouping application 54 can reside within and be executed by the zone manager 52 and/or the work station 56. The necessary connector grouping instructions, commands, permissions, restrictions and other access control policy information involved can be transmitted to one or more initiator devices and expanders, as necessary, via an appropriate connection between the zone manager 52 and the particular domain devices.

The method 60 includes a step 62 of determining the connectors within the SAS domain that are available for connector grouping. The connector grouping application 54 is configured to provide a list of available connectors on the edge of the ZPSDS that are available for forming or defining zones. Zones are a collection of objects, e.g., connectors who's attached (downstream) devices have visibility to one another, i.e., that are capable of communicating with one another. As part of the determining step 62, the connector grouping application 54 omits connectors within the SAS domain that are used to link expanders within the ZPSDS. Per the SAS specification, within an SAS domain, connectors that are used to link expanders within the ZPSDS must be placed into a specific zone group (e.g., Zone Group 1) and therefore are not to be configured. Accordingly, such connectors are not available for connector grouping according to embodiments of the invention.

The method 60 also includes a step 64 of defining zones. The connector grouping application 54 is configured to bundle connectors into various zones by selecting one or more connectors from the list of available connectors. As discussed herein, a zone is a collection of connectors or other objects that have visibility with one another, i.e., have the potential or capability to communicate with one another. The bundling of available connectors into various zones can be performed using any suitable criteria.

As part of the step 64 of defining zones, multiple zones can be defined, e.g., to fulfill zoning requirements. For example, an administrator may segment an SAS domain by dividing the connectors into zones. Also, as part of the step 64 of defining zones, one or more of the defined zones can overlap by placing a connector in multiple zones.

Once all of the appropriate zones for the SAS domain have been defined, the connector grouping application 54 then determines the minimal number of zone groups, and their respective permissions, to realize the zone definitions. This process initially involves creating one zone group per each defined zone, populating each zone group with the phys associated with the connectors in the particular defined zone, and configuring the permissions for the phys in the created zone group to communicate with each other.

In this manner, the method 60 includes a step 66 of identifying one of the defined zones. As will be discussed in greater detail hereinbelow, the method 60 eventually will loop through or identify all of the defined zones and perform a series of steps for each identified zone. The method 60 includes a step 68 of creating a zone group for the identified zone. The zone group creating step 68 creates only one zone group for the identified zone and, as will be seen from further discussion hereinbelow, only one zone group is created for each zone.

The method also includes a step 72 of populating the created zone group with appropriate connector phys. Once a zone group has been created for the identified zone, the populating step 72 populates the created zone group with the phys associated with the connectors in the zone for which the zone group was created.

The method also includes a step 74 of configuring permissions for the phys in the particular zone group. Once the created zone group has been populated with the appropriate connector phys, i.e., the phys associated with the connectors in the zone for which the zone group was created, the configuring step 74 configures the permissions for those phys in such a way that each phy in the zone group has permission to communicate with all other phys in the zone group.

The method 60 also includes a step 76 of determining whether or not all defined zones in the SAS domain have been identified for zone group creation and phys population, and for permissions configuration. If not all defined zones in the SAS domain have been identified so that a corresponding zone group can be created therefor (N), the method 60 moves to another defined zone in the SAS domain, as shown generally by a "next zone" step 78. Then, the process of identifying the zone (step 66), creating one zone group for the identified zone (step 68), populating the zone group with the appropriate connector phys (step 72) and configuring the permissions for zone group phys (step 74) is performed for the particular defined zone. This process is repeated for all defined zones in the SAS domain. Returning to the decision step 76, if all defined zones in the SAS domain have been identified and subsequent zone group creation, connector phys population and permission configuration have been performed (Y), the method 60 proceeds to the steps involved in the process of comparing all zone groups with all other zone groups, e.g., as shown in FIG. 5.

Referring now to FIG. 5, shown is a block diagram of the remaining portion of the method 60 for SAS domain zoning using a connector grouping application 54 according to embodiments of the invention. As part of the process of comparing all zone groups with each other, the method 60 includes a step 82 of comparing a current zone group with one of the existing or remaining zone groups in the SAS domain. Each of the existing or remaining zone groups can be a zone group that was created by the zone group creation step 68 (FIG. 4) or a zone group that was created subsequently, i.e., created as part of the zone group comparison process, as will be discussed hereinbelow.

The comparing step 82 compares the phys of the current zone group with the phys of a particular remaining zone group in the SAS domain. The comparing step 82 is looking for phys that reside in both the current zone group and the particular remaining zone group. In this manner, the method 60 includes a step 84 of determining whether or not there are any phys common to both the current zone group and the particular remaining zone group being compared with the current zone group. If the determining step 84 determines that there are no phys common to both the current zone group and the particular remaining zone group (N), the method 60 continues to a step 86 of determining whether or not all remaining zone groups have been compared with the current zone group.

If the determining step 84 determines that there are phys common to both the current zone group and the particular remaining zone group (Y), the method 60 performs a step 88 of creating a new zone group for the common phys. The method 60 then performs a step 92 of moving the phys common to both the current zone group and the particular remaining zone group to the new zone group that was just created by the zone group creating step 88.

The method 60 also includes a step 94 of configuring permissions for the phys just moved to the newly created (common phys) zone group. Once the method 60 performs the step 92 of moving the phys common to both the current zone group and the particular remaining zone group to the newly created (common phys) zone group, the configuring step 94 configures the appropriate permissions for those common phys in such a way that each of the common phys in the newly created (common phys) zone group has permission to communicate with all other phys in the newly created (common phys) zone group, and with the remaining phys in both the current zone group and the particular remaining zone group.

The method 60 also includes a step 96 of transferring all permissions from either one or both of the zone groups from which the common phys were removed, if that particular zone group has become empty of phys as a result of the removal of the common phys to the newly created (common phys) zone group. That is, if all of the phys in the current zone group were common to at least a portion of the phys in the particular remaining zone group to which the current zone group was compared, the removal of those common phys from the current zone group to the newly created (common phys) zone group will leave the current zone group empty. In such case, the transferring step 96 will transfer all permissions from the current zone group to the newly created (common phys) zone group. Similarly, if all of the phys in the particular remaining zone group were common to at least a portion of the phys in the current zone group to which the particular remaining zone group was compared, the removal of those common phys from the particular remaining zone group to the newly created (common phys) zone group will leave the particular remaining group empty. In such case, the transferring step 96 will transfer all permissions from the particular remaining group to the newly created (common phys) zone group. The method 60 then returns to the determining step 86.

If the determining step 86 determines that not all remaining zone groups have been compared to the current zone group (N), the method 60 moves to another remaining zone group, as shown generally by a "next remaining zone group" step 98. Then, the zone group comparison process continues with the comparison step 82 comparing the current zone group with the next (another) remaining zone group. This comparison process continues until the current zone group has been compared with all remaining zone groups.

If the determining step 86 determines that all remaining zone groups have been compared to the current zone group (Y), the method 60 continues to a step 102 of determining whether or not all zone groups have been designated as a current zone group for purposes of being compared with all remaining zone groups. If the determining step 102 determines that not all zone groups have been designated as a current zone group, and therefore have not gone through the process of being compared with all remaining zone groups (N), the method 60 performs a step 104 of designating another or the next zone group as the current zone group for purposes of comparison with the remaining zone groups.

The method 60 then returns to the comparing step 82 with the new current zone group. The process of comparing the current zone group with all remaining zone groups continues, e.g., as discussed hereinabove, until all zone groups have been a current zone group and compared with all remaining zone groups. If the determining step 102 determines that all zone groups have been designated as a current zone group, and therefore gone through the process of being compared with all remaining zone groups (Y), the method 60 performs a step 106 of transmitting all zone group information and corresponding permissions to the zone manager 52. That is, the transmitting step 106 transmits all information associated with all zone groups, and the corresponding permissions of all zone groups, to the zone manager 52.

As discussed hereinabove, the SAS connector grouping management application described herein simplifies the work of an SAS domain administrator, e.g., by allowing an SAS domain administrator to interface with the particular SAS zoning application without requiring the administrator to deconstruct the zoning requirements down to the phy level. The connector grouping applications allow connectors on the edge of the ZPSDS to be grouped into any number of defined zones, and these defined zone then are used to create the minimal number of zone groups, and to configure the respective permissions of those zone groups.

Figure 6:
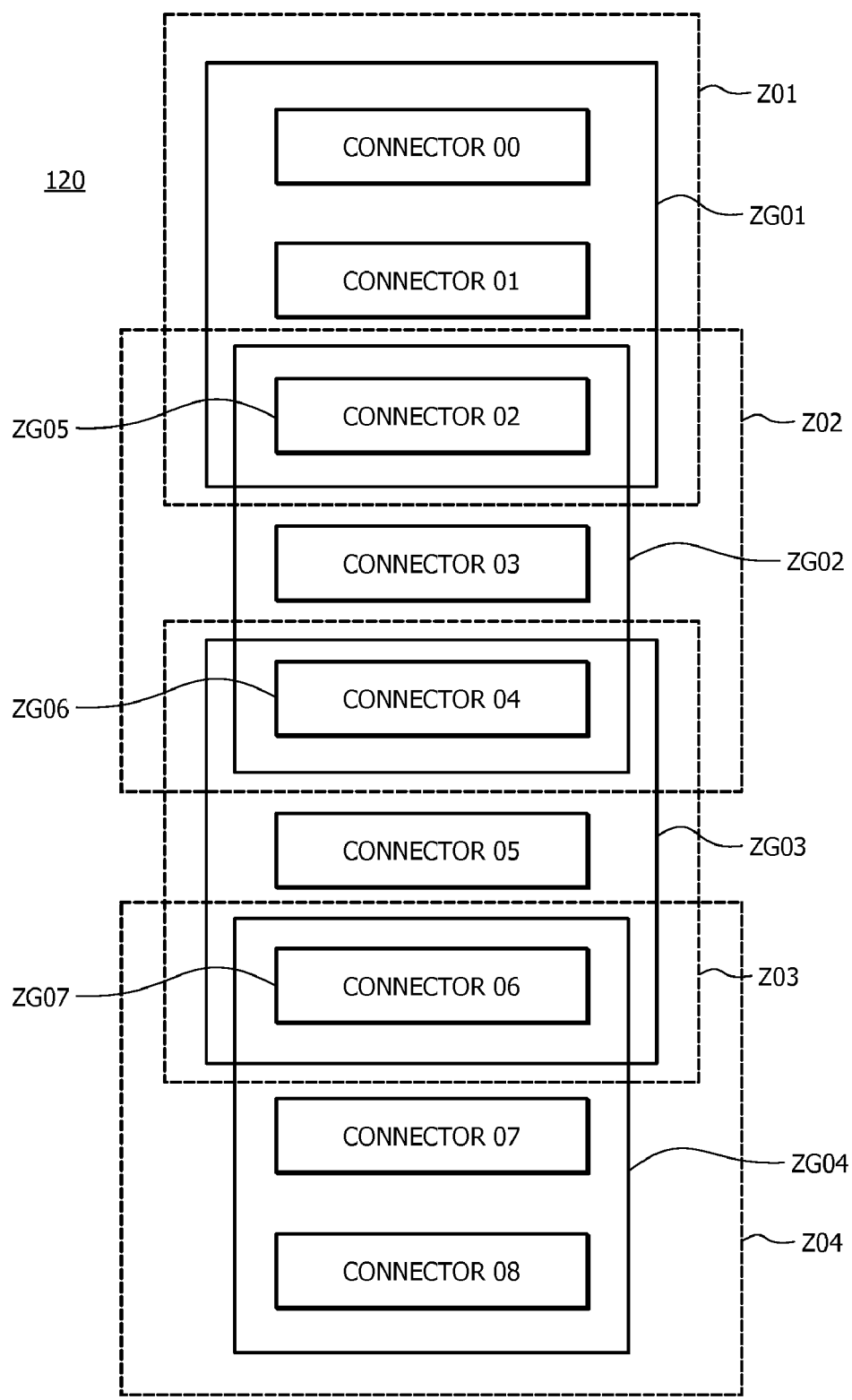
FIG. 6 is a block diagram of a group of SAS connectors defined by zone groups according to embodiments of the invention.

Referring now to FIG. 6, as an example, shown is a group 120 of SAS connectors defined by zones according to embodiments of the invention. The group 120 of connectors includes nine SAS connectors: connector00 through connector08. A first zone z01 has been defined as including connector00, connector01 and connector02. A second zone z02 has been defined as including connector02, connector03 and connector04. A third zone z03 has been defined as including connector04, connector05 and connector06. A fourth zone z04 has been defined as including connector06, connector07 and connector08.

Initially, four zone groups zg01, zg02, zg03 and zg04 were created and populated with the phys associated with connectors resident in their respective zones z01, z02, z03 and z04. According to embodiments of the invention, the connector grouping application 54 identifies phys, and their associated connectors, in the intersecting regions. That is, for example, the connector02 is identified as residing in the first zone group zg01 and also in the second zone group zg02, the connector04 is identified as residing in the second zone group zg02 and in the third zone group zg03, and the connector06 is identified as residing in the third zone group zg03 and in the fourth zone group zg04.

As discussed hereinabove, the phys identified as residing in the more than one zone group are moved to a newly created zone group. Therefore, the connector02 will be moved to a new (fifth) zone group zg05. Also, the connector04 will be moved to a new (sixth) zone group zg06, and the connector06 will be moved to a new (seventh) zone group zg07.

It will be apparent to those skilled in the art that many changes and substitutions can be made to the embodiments of the invention herein described without departing from the spirit and scope of the invention as defined by the appended claims and their full scope of equivalents.

The invention claimed is:

1. A connector grouping method for managing SAS zoning within an SAS domain, wherein the SAS domain includes a plurality of connectors each having at least one phy, the method comprising the steps of:
   bundling at least one connector within the SAS domain to define at least one zone;
   creating at least one zone group based on the defined zones, wherein the zone group includes phys associated with the connectors bundled in the zone from which the zone group is based; and
   comparing, after all zone groups based on the defined zones have been created, each zone group with all other zone groups, wherein the zone group comparing step includes
      identifying, after all zone groups based on the defined zones have been created, zone groups having at least one common phy,
      creating a new zone group for phys common to more than one existing zone group,
      moving the phys common to more than one existing zone group to the new zone group, and
      configuring the common phys within the new zone group in such a way that the common phys within the new zone group can communicate with other common phys in the new zone group and with the phys in the zone groups from which the common phys were removed,
   wherein the comparing step is repeated until no zone group has any phys common to any other zone group.

2. The method as recited in claim 1, further comprising the step of configuring the phys within each zone group in such a way that the phys within each zone group can communicate with other phys in the same zone group.

3. The method as recited in claim 1, wherein the step of creating at least one zone group based on the defined zones includes:
   creating one zone group per defined zone,
   populating the zone group with the phys associated with the connectors bundled in the zone from which the zone group is based, and
   configuring the phys within each zone group in such a way that the phys within each zone group can communicate with other phys in the same zone group.

4. The method as recited in claim 1, wherein the identifying step includes comparing each zone group with all other existing zone groups to identify the zone groups having at least one common phy.

5. The method as recited in claim 1, wherein, if a zone group has had all phys removed therefrom by the common phys moving step, the method further comprises the step of transferring all communication permissions from the zone group with no phys to the new zone group created for the common phys.

6. The method as recited in claim 1, wherein the SAS domain includes a zone manager, and wherein the method further comprises the step of transferring information associated with the zone groups and their respective configurations from the zone groups to the zone manager.

7. The method as recited in claim 1, wherein the zone groups are created in such a way that no zone group shares a common subset of phys with any other zone group.

8. The method as recited in claim 1, further comprising the step of determining the connectors within the SAS domain that are available for connector grouping to define a zone.

9. A connector grouping SAS zoning management application apparatus for use in managing SAS zoning within an SAS domain having at least one initiator device and at least one zoning expander device coupled to the initiator device, wherein the SAS domain includes a plurality of connectors each having at least one phy, the apparatus comprising:
   an interface for coupling to at least one of the initiator devices and the zoning expander devices; and
   a controller coupled to the interface and including at least a portion of a connector grouping application,
   wherein the connector grouping application is configured to
      bundle at least one connector within the SAS domain to define at least one zone,
      create at least one first zone group and at least one second zone group based on the defined zones, wherein the first zone group and the second zone group each include phys associated with the connectors bundled in the zone from which the respective zone group is based,
      determine whether a phy residing in the first zone group also resides in the second zone group,
      create a new zone group for phys common to the first zone group and the second zone group,
      move the phys common to the first zone group and the second zone group from their respective zone groups to the new zone group, and
      configure the common phys within the new zone group in such a way that the common phys within the new zone group can communicate with other common phys in the new zone group and with the phys in the zone groups from which the common phys were removed,
   wherein the connector grouping application is configured to create new zone groups for common phys, move common phys to new zone groups and configuration common phys within new zone groups until no zone group has any phys common to any other zone group.

10. The apparatus as recited in claim 9, wherein the connector grouping application is configured to configure the phys within any zone group in the SAS domain in such a way that the phys within each zone group can communicate with other phys in the same zone group.

11. The apparatus as recited in claim 9, wherein the connector grouping application is configured to create the at least one zone group based on the defined zones by:
   creating one zone group per defined zone,
   populating the zone group with the phys associated with the connectors bundled in the zone from which the zone group is based, and configuring the phys within each zone group in such a way that the phys within each zone group can communicate with other phys in the same zone group.

12. The apparatus as recited in claim 9, wherein the determining step includes comparing each zone group with all other existing zone groups to identify the zone groups having at least one common phy.

13. The apparatus as recited in claim 9, wherein the connector grouping application is configured to transfer at least a portion of communication permissions from the first zone group to the new zone group if the first zone group does not have any phys residing therein.

14. The apparatus as recited in claim 9, wherein the SAS domain includes a zone manager, and wherein the connector grouping application is configured to transfer information associated with at least one zone group and the configuration of the at least one zone group from the zone group to the zone manager.

15. The apparatus as recited in claim 9, wherein the SAS domain includes a zone manager and a work station, and wherein at least a portion of the connector grouping application resides within at least one of the zone manager and the work station.

16. A computer readable medium storing instructions that carry out a method for managing SAS zoning within an SAS domain, wherein the SAS domain includes a plurality of connectors each having a plurality of phys, the computer readable medium comprising:

- instructions for bundling at least one connector within the SAS domain to define at least one zone;
- instructions for creating at least one zone group based on the defined zones, wherein the zone group includes phys associated with the connectors bundled in the zone from which the zone group is based; and
- instructions for comparing, after all zone groups based on the defined zones have been created, each zone group with all other zone groups, wherein the zone group comparing instructions include
  - instructions for identifying, after all zone groups based on the defined zones have been created, zone groups having at least one common phy,
  - instructions for creating a new zone group for phys common to more than one existing zone group,
  - instructions for moving the phys common to more than one existing zone group to the new zone group, and
  - instructions for configuring the common phys within the new zone group in such a way that the common phys within the new zone group can communicate with other common phys in the new zone group and with the phys in the zone groups from which the common phys were removed,
  - wherein the instructions for comparing are repeated until no zone group has any phys common to any other zone group.

17. The computer readable medium as recited in claim 16, wherein the computer readable medium includes instructions for configuring the phys within each zone group in such a way that the phys within each zone group can communicate with other phys in the same zone group.

18. The computer readable medium as recited in claim 16, wherein the instructions for creating at least one zone group based on the defined zones include:

- instructions for creating one zone group per defined zone,
- instructions for populating the zone group with the phys associated with the connectors bundled in the zone from which the zone group is based, and
- instructions for configuring the phys within each zone group in such a way that the phys within each zone group can communicate with other phys in the same zone group.

19. The computer readable medium as recited in claim 16, wherein the SAS domain includes a zone manager, and wherein the computer readable medium includes instructions for transferring information associated with the zone groups and their respective configurations from the zone groups to the zone manager.

* * * * *